United States Patent [19]
Brown et al.
[11] Patent Number: 4,730,719
[45] Date of Patent: Mar. 15, 1988

[54] ROLLER FOR ORIENTATION OF FRUIT

[75] Inventors: Ian A. Brown; Everett P. Ristow; Richard D. Walters, all of Tulare County, Calif.
[73] Assignee: Pennwalt Corporation, Philadelphia, Pa.

[21] Appl. No.: 891,007
[22] Filed: Jul. 28, 1986

Related U.S. Application Data

[63] Continuation-in-part of Ser. No. 757,559, Jul. 22, 1985, abandoned.

[51] Int. Cl.[4] .............................................. B65G 47/24
[52] U.S. Cl. .................................... 198/387; 198/779; 209/701
[58] Field of Search ............... 198/387, 779, 842, 843; 209/701, 705, 912

[56] References Cited

U.S. PATENT DOCUMENTS

| | | | |
|---|---|---|---|
| 2,717,071 | 9/1955 | Cook | 198/189 |
| 2,921,669 | 1/1960 | Bainbridge | 198/196 |
| 3,013,661 | 12/1961 | Strubhar | 209/701 X |
| 3,715,024 | 2/1973 | Mumma | 198/779 X |
| 4,184,598 | 1/1980 | Cowlin et al. | 209/705 |
| 4,213,533 | 7/1980 | Sardo | 209/701 X |
| 4,422,543 | 12/1983 | Stubbings | 198/782 |
| 4,482,061 | 11/1984 | Leverett | 209/701 X |

FOREIGN PATENT DOCUMENTS

| | | | |
|---|---|---|---|
| 591035 | 1/1960 | Canada | 198/387 |
| 603097 | 9/1934 | Fed. Rep. of Germany | 209/701 |
| 2916282 | 10/1980 | Fed. Rep. of Germany | 198/779 |
| 286384 | 11/1970 | U.S.S.R. | 198/779 |

*Primary Examiner*—Frank E. Werner
*Assistant Examiner*—Jonathan D. Holmes

[57] ABSTRACT

Rollers for use with singulators for orienting articles, typically fruit, prior to optical sensing, for example, of the fruit's surfaces, wherein fruit having diverse diameters, irregular shapes and bumpy surfaces are properly oriented by contacting a pair of symmetrically disposed truncated conical surfaces sloping uniformly inwardly to a point short of center to form a sheave portion, as well as a deep pocket within each roller and between adjacent rollers, and wherein spacing between rollers remains constant notwithstanding the diverse diameters of the fruit. A drive belt is engageable within the sheave portion of the roller for controlling speed and direction of rotation of the rollers.

2 Claims, 2 Drawing Figures

ROLLER FOR ORIENTATION OF FRUIT

This application is a continuation-in-part of our co-pending application for "Improved Roller for Orientation of Fruit", Ser. No. 757,559, filed July 22, 1985, assigned to the assignee hereof, now abandoned.

STATEMENT OF THE INVENTION

This invention relates to the grading and sorting of articles such as fruit, for example, and more particularly concerns an improved roller for use in singulator apparatus which orients fruits of varying sizes and shapes prior to being optically scanned or further processed.

BACKGROUND AND SUMMARY OF THE INVENTION

The grading and sorting of fruit have become increasingly automated in recent years as labor costs have sharply escalated. Automatic sorting apparatus, for example, are now capable of inspecting each piece of fruit as it passes by optical sensing means which generates signals in response to color, blemishes, and the like. The signals are then employed to actuate fruit diverting mechanism if cull fruit are sensed, or color sensing signals and weight sensing signals may be simultaneously processed to yield a combined weight/color signal which is used to sort the fruit downstream of the sensors.

Typically, fruit is delivered from a storage bin onto a belt conveyor and then to a roller conveyor, called a singulator, which aligns the fruit into a single lane if one singulator is used, or into a plurality of single-file fruit lanes if a plurality of singulators is employed. The singulator transports the fruit to another singulator (typically, after passing over an idler roller or two) having rollers which are caused to be rapidly rotated to thereby rapidly spin the fruit thereon while being optically sensed in order for the sensor means to see more of the fruit's surface and hence provide more accurate sensing data.

Prior to optical scanning of the fruit, the fruit must be properly oriented. Proper orientation of the fruit, i.e., the fruit stem axes should be substantially parallel with the roller axes, is desirable if the fruit are to remain on the singulator without flipping off during their temporary rapid rotation while being scanned, and to reduce the possibility of the stem end of the fruit from being sensed as an ordinary blemish.

The present invention provides an improved roller readily usable with existing equipment. The rollers are capable of orienting fruit having diverse and disparate diameters, i.e., kiwi fruit, for example, having small diameters as well as grapefruit, having diameters approaching about 6½ inches without any need to rearrange spacing between adjacent rollers due to large differences in fruit diameters.

The improved roller is provided with a "pocket" considerately deeper than those provided by existing rollers, resulting in deeper pockets between adjacent rollers. A spacing between adjacent rollers of only about ½ inch is needed, the rollers being measured at their outermost diameters, so long as the diameter of the fruit being oriented does not substantially exceed the diameters of grapefruit.

Proper orientation is particularly significant with fruits such as grapefruit, lemons, oranges and apples, for example. Oranges and grapefruit are normally aspherical; the fruit tends to flop over from side to side when handled on typical fruit orientation systems. With the improved rollers of the present invention, grapefruit and oranges, for example, are automatically oriented to "stand up" and rotate in wheel-like formation, i.e., with their stem axes substantially parallel to the axes of the rollers. As aforementioned, proper fruit orientation is essential if the fruit is to be subsequently rapidly rotated and scanned for analysis of their surfaces.

DETAILED DESCRIPTION OF THE INVENTION

Figure 1:
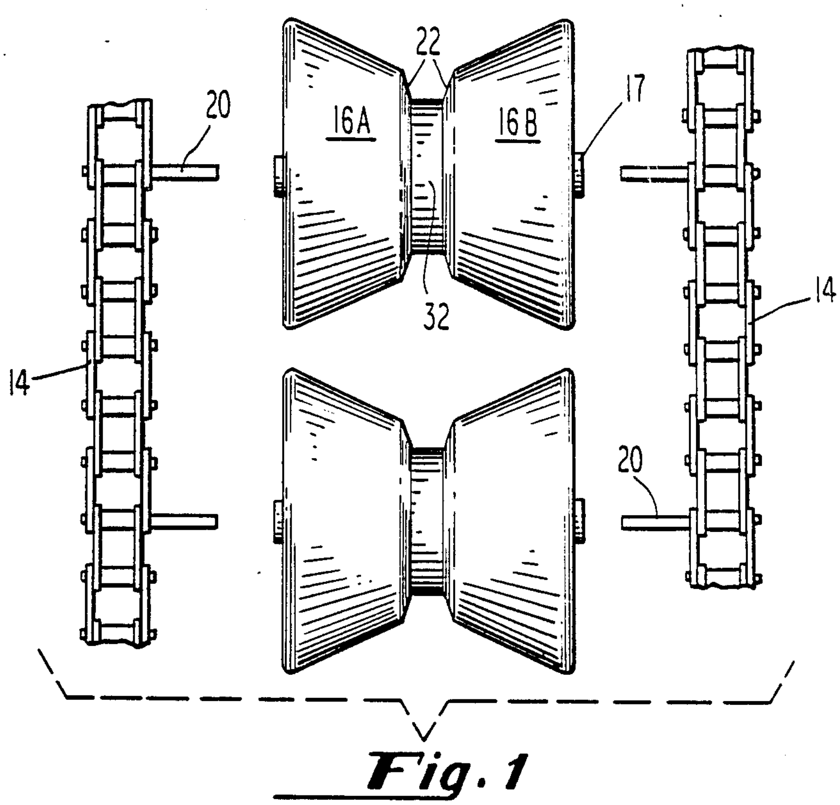
FIG. 1 is an exploded fragmentary plan view of several rollers of the present invention in operable formation with chain means for conveying the rollers.

Referring to FIG. 1, the article or fruit orientation singulator comprises a plurality of the improved rollers 12 of the present invention, evenly spaced, each conveyed or transported by chains 14 disposed on each side of the rollers. Chains 14 are driven in unison by conventional sprocket and motor means, not shown. The singulator may be about 8 feet long, or of sufficient length to properly orient the fruit prior to their acceleration of rotation for optical scanning purposes by spin-up means. Fruit spin-up means is not shown and forms no part of the present invention.

Figure 2:
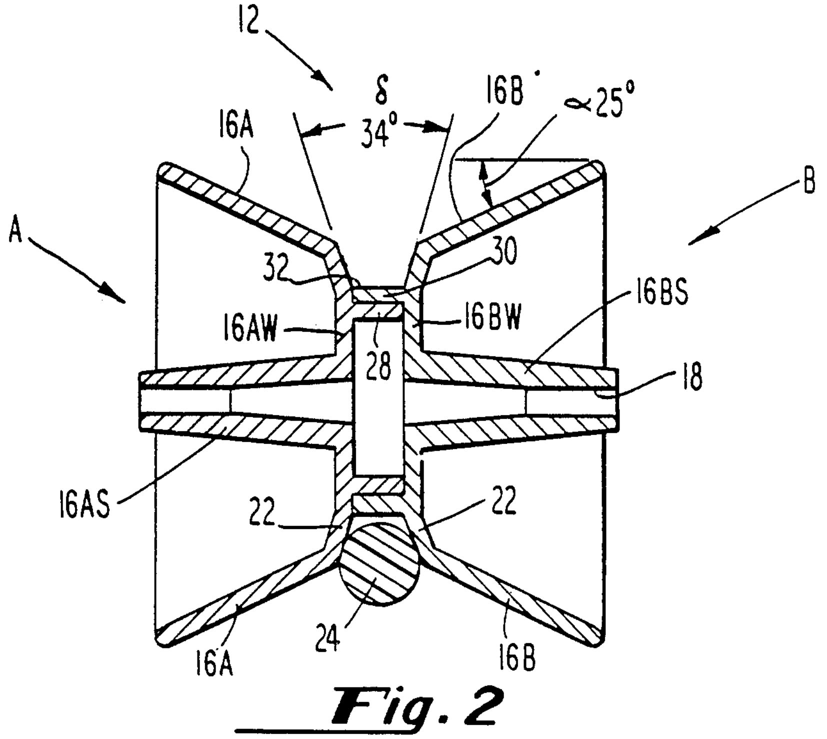
FIG. 2 is a sectional view of a roller of FIG. 1 including drive belt means for varying and controlling rotational speed of the rollers.

Rollers 12 are conveniently fabricated in two cup-like roller half sections, A and B, as illustrated in FIG. 2 of the drawings, but may be formed as a single unit. The rollers may be made from acrylonitrile butadiene styrene, or other suitable plastic, such as polytetrafluorethylene, for example.

Each roller 12 is provided with a deep pocket, i.e., the area formed by the sloping surfaces, or fruit-contacting surfaces 16A and 16B which form an angle of about 25° with the horizontal (FIG. 2), which angle has been empirically determined as optimum for properly orienting fruits having diameters whicha re typical of kiwi fruit through grapefruit, including fruit which are irregular in shape, bumpy, and the like. The 25° slope towards the center of the roller from each side thereof provides a deep pocket for each roller, and between adjacent rollers, which offer optimum contact surfaces with the fruit being oriented to thereby provide stability to the fruit, i.e., the substantial elimination of bouncing and gyration from side to side of the fruit which was prevalent in many existing fruit orienting systems.

Fruit stability is of especial importance when the fruit must pass from the singulator to the spin-up means for optical scanning purposes. That is, a piece of gyrating or bouncing fruit will have a strong tendency to flip off the spin-up conveyor when the fruit's speed of rotation is rapidly accelerated.

Each roller half cup-like section A and B is provided with a hollow, outwardly and laterally extending spindle 16AS and 16BS respectively from a substantially vertical wall portion 16AW and 16BW. The spindles form an axial bore 18 through roller 12. Of course, cup-like sections A and B may be formed as a solid unit and axial bore 18 formed therethrough. Extension pins 20 of chains 14 engage bore 18. Rollers 12 are rotatable around pins 20. Movement of chains 14 carry rollers 12 therealong.

Bores 18 enlarge gradually within the spindles as they approach the center of the roller from a point intermediate the length of the spindles. The gradual taper towards the spindle outer ends facilitates extrusion of the half sections A and B. Of course, the bore may be of uniform diameter throughout.

The roller is provided with a centrally disposed sheave portion 22, formed inwardly of the fruit-contacting surfaces 16A and 16B. Included sheave angle δ, preferably about 34°, was determined empirically to be capable of readily engaging a ½" drive belt 24 and yet maintain the deep pocket advantages of the roller and between adjacent rollers for orienting fruits of diverse diameters, but especially grapefruits, lemons, oranges and apples.

Roller half sections A & B are each provided with a lip 28 and 30 extending inwardly laterally from walls 16AW and 16BW respectively. Lip 28 fits snugly within lip 30 notwithstanding the presence of a conventional energy director (not shown) on one of the surfaces of the lips which contacts the other. The energy director is a minute annular protrusion around the lip which fuses when subjected to ultrasonic energy to thereby weld roller half sections A and B together. Solvent cements and the like, of course, may also be employed to unite the sections.

Lip 30, the outer of the lips, forms a horizontally disposed central root diameter surface 32 which is preferably not contacted by drive belt 24.

Angle α of about 25° is considered essential. If the roller pockets are made deeper by providing an angle α substantially greater than 25°, existing fruit diverters for ejecting culls at a rate of up to about 10 fruit per second from a pack line would require extensive modification or their rate of ejection or diversion would be reduced. It is appreciated that a plurality of singulators are normally emloyed in production lines, often from 9 to 16 singulators working off a pair of chains 14. Further, optical illuminating means associated with the optical scanning or sensing means would see less of the fruit's surface since fruit, especially small fruit, would sit deeper in the roller pockets between adjacent rollers and therefore be further shadowed by the roller fruit-contacting surfaces 16A and 16B. Additionally, the roller diameters would be increased to such an extent that existing equipment might require modification, and the cost and weight per roller unnecessarily increased.

Conversely, if the roller pockets for each roller and between adjacent rollers were made shallower by decreasing angle α substantially below 25°, as with existing rollers, large fruit would exhibit a proclivity toward bouncing and gyration. Similarly, rollers having multi-angle fruit-contacting surfaces have a tendency to bounce and gyrate fruit, especially fruit having larger diameters. As aforementioned, bouncing and gyrating fruit are not amenable to rapid acceleration of their rotational speeds for purposes of optical scanning of their surfaces.

Preferred dimensions of the improved rollers 12 are:

Roller diameter at outermost extremities of contact surfaces 16A and 16B—3.0; inches; root diameter 32—1.4 inches; width of root diameter 32—0.328 inches; roller width—2.75 inches; included sheave angle δ—34°; angle α—25°; diameters of pins 20 and drive belt 24 respectively—5/32 inch and ½ inch; distance between axis of bore 18 to outer and inner parts respectively of serrated sheave portion 22—0.987 inches and 0.7 inches; distance between the center lines of drive belt 24 on any individual roller 12—2.06 inches; and distance between pins 20 of adjacent rollers, center line to center line—3½ inches.

In operation, articles or fruit are conveyed on the singulator by chains 14 at typical speeds of approximately 28"/second, i.e., 8 roller diameters ×½" spacing between rollers. Fruit carried by the rollers are not necessarily rotating thereon since the rollers are merely being transported by the chains. Drive belt 24 is connected by conventional means to a variable speed reversible motor (not shown). Drive belt 24 engages the serrated sheave portion 22 and causes the rollers to rotate at a controlled rotational speed in either direction of rotation. If grapefruit rather than kiwi fruit, for example, are being oriented, it is desirable to have drive belt 24 move more rapidly in order that the grapefruit "stand up" in wheellike formation prior to contact with the idler and spin-up rollers. The speed of drive belt 24 may be reduced for orienting kiwi fruit, for example.

In optical scanning, the spin-up rollers are caused to rotate in a direction wherein the upper surfaces of the fruit move in the same direction as the spin-up conveyor or singulator, thereby permitting a greater surface area of the fruit to be exposed to the optical illuminators (not shown).

Movement of drive belt 24 in one direction or the other causes rollers 12 and fruit carried thereon to rotate accordingly. Normally, when orienting fruit prior to optical scanning, the fruit rotate in a direction opposite to the direction of rotation of the fruit while being scanned; in optical sizing, the fruit may be caused to rotate in the same direction.

It is apparent from the above description that we have provided improved rollers for use with singulators for orienting articles, typically fruit, prior to optical scanning, for example, of the fruit's surfaces. The fruit may have diameters varying between about 1½ to 6½ inches, may be irregular in shape as well as bumpy, and yet the spacing between adjacent rollers may be maintained constant about ½ inch.

We claim:

1. An improved roller for use with chain means of conveying apparatus for transporting and orienting articles thereon such as fruit and the like, said chain means having spaced pin means extending therefrom, said roller comprising (a) a pair of symmetrically disposed united and interlocked cones rotatable as a unit having a common axis, each of said cones having lateral surfaces or slant heights forming article-contacting surfaces, each of said lateral surfaces forming an angle with the horizontal of about 25° and sloping uniformly inwardly from the base of said cone towards said axis, (b) sheave portions provided inwardly from each of said lateral surfaces, outer portions of each of said sheave portions coinciding with the circumference of said lateral surfaces at the innermost portion of said lateral surfaces, the sheave portion of each cone forming an angle of about 17° with the vertical or the sheave portions together having between them an included sheave angle of about 34°, (c) said sheave portions terminating inwardly at a centrally horizontally disposed root diameter surface having a circumference or peripheral portion with an axis coinciding with said common axis, and (d) an axial bore through said roller coinciding with said common axis, said pin means extending from said chain means engaging said roller bores, said rollers rotatable around said pin means, said sheave portions being engageable by drive belt means for controlling the speed and direction of rotation of said rollers.

2. The improved roller of claim 1 wherein said sheave portions are serrated.

* * * * *